(12) United States Patent
Lele et al.

(10) Patent No.: US 6,346,643 B1
(45) Date of Patent: Feb. 12, 2002

(54) PROCESS FOR THE PREPARATION OF DIESTERS OF POLY(OXYALKYLENE GLYCOL) AND AMINO ACIDS

(75) Inventors: Bhalchandra Shripad Lele; Mohan Gopalkrishna Kulkarni, both of Maharashtra (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 09/518,877

(22) Filed: Mar. 6, 2000

(30) Foreign Application Priority Data

Apr. 19, 1999 (IN) ................................. 593/99

(51) Int. Cl.$^7$ ............................................. C07C 261/00
(52) U.S. Cl. ........................ 560/158; 568/606; 568/613
(58) Field of Search ........................ 560/158; 568/606, 568/613

(56) References Cited

PUBLICATIONS

Kohn et al, Hydrogels based on Water–Soluble Poly(ether urethanes) Derived from L–Lysine and Poly (ethylene glycol), Sep. 27, 1991, Macromolecules, 25, p. 4476–4484.*

* cited by examiner

*Primary Examiner*—Gary Geist
*Assistant Examiner*—Taylor V. Oh
(74) *Attorney, Agent, or Firm*—Darby & Darby

(57) ABSTRACT

The present invention relates to a process for the preparation of diesters of poly (ethylene glycol) by reacting poly (oxyalkylene glycol) and amino acid hydrochloride in the presence of a condensing agent in a suitable solvent at a temperature in the range of 0° C. to room temperature for a period ranging between 1 hour to 24 hours. The reaction mixture is then filtered and the filtrate poured into another solvent, which is a nonsolvent for the products. The products precipitated thereby are then isolated.

9 Claims, No Drawings

PROCESS FOR THE PREPARATION OF DIESTERS OF POLY(OXYALKYLENE GLYCOL) AND AMINO ACIDS

FIELD OF THE INVENTION

The present invention relates to a process for the preparation of diesters of poly(oxyalkylene glycols) with amino acid hydrochlorides. More particularly, the present invention relates to a process for the preparation of diesters of poly (oxyalkylene glycols) and amino acid hydrochlorides having structures according to formula I below,

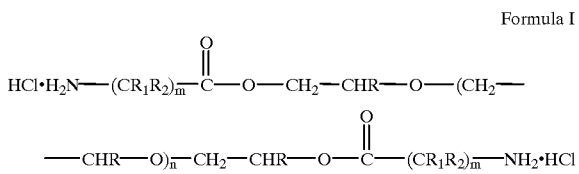

Formula I wherein $R_1$ and $R_2$ are H, m is an integer from 0 to 12, or
when $R_1$ is H, $R_2$ is —$CH_2$—Ph—OH or —$CH_2$—SH or —$CH_3$—(CH)—$CH_2$—$CH_3$ and m is an integer equal to 1, R is hydrogen or methyl or a mixture of hydrogen and methyl on the individual molecule, and n is an integer of from 0 to 100.

BACKGROUND OF THE INVENTION

Diesters or diamide derivatives of poly (ethylene glycols) with various amino acids are important monomers that are used in the syntheses of biodegradable polymers. E.g. Pechar et al (1997) reported synthesis of L-glutamic acid based polymeric pro-drugs wherein monomethoxy poly (oxyethylene) monocarboxylic acid was first condensed with para nitro phenol in the presence of dicyclohexylcarboxiimide (DCC) in order to activate the PEG moeity. Subsequently various oligopeptides containing L-glutamic acid were reacted with para-nitrophenyl ester of monomethoxy poly (oxyethylene) carboxylic acid. (M. Pechar, J. Strohalm and K. Ulbrich, *Macromol. Chem.*, 198, 1009 (1997). Kohn et al (1992) reported the synthesis of water soluble poly (ether-urethane) based on PEG and L-lysine. In this, poly (ethylene glycol) was first reacted with phosgene ($COCl_2$) and then treated with N-hydroxysuccinimide in the presence of DCC to obtain activated bis (succinimidyl carbonate) derivative of PEG. This was reacted with lysine methyl ester to obtain poly (ether-urethane) (A. Nathan, D. Bolikal, N. Vyavahare, S. Zalipsky and J. Kohn, *Macromolecules* 25, 4476 (1992)).

Such indirect routes for linking amino acids with PEG chains were undertaken mainly due to the following reasons. Esters of amino acids are generally synthesised and stored as hydrochloride salts because esters of amino acids with free —$NH_2$ group are prone to undergo diketopiperazine formation. Conventional procedure for synthesis of amino acid ester hydrochloride that comprises reacting alcohol, aminoacid and thionyl chloride is not feasible for poly (ethylene glycol) because of of its bulky chain length. Thus amino acid ester hydrochloride of poly (ethylene glycol) needs to be synthesised in two steps. In the first para toluene sulfonate salt of the diester is synthesised by conventional Dean-Stark type esterification using stoichiometric amounts of amino acid, poly (ethylene glycol) and para toluene sulfonic acid monohydrate. In the second step, paratoluene sulfonate is deblocked by the treatment of base such as triethylamine or sodium bicarbonate. The free ester so synthesised is then converted into the hydrochloride salt by passing dry hydrochloride gas into solution of the ester diethyl ether.

Carbodiimides are strong condensing reagents that are routinely used in condensation reactions of N-protected amino acids. Various speciality protecting groups such as N-carbobenzoxy, N-tertiarybutyloxycarbonyl, etc. are used for this purpose. [M. Bodanzsky and A. Bodanzsky, *The Practice of peptide synthesis,* Springerverlag, New York, USA, (1984)]. However, the use of the hydrochloride salt as amino protecting group in carbodiimide mediated condensation reactions of amino acids has not been reported as yet.

The only reference relating to the use of amino acid hydrochloride salts as the —$NH_2$ protecting group in carbodiimide mediated condensation reactions was in B. S. Lele, M. A. Gore, M. G. Kulkarni, *Synth. Commun.* (IN Press, 1999).

OBJECTS OF THE INVENTION

Accordingly it is an object of the invention to provide a single step process for the preparation of diesters of poly (oxyalkylene glycol) and amino acids.

It is a further object of the invention to provide a process for the preparation of diesters of poly (oxyalkylene glycols) and amino acids that can be carried out under mild conditions and is generally applicable to several amino acids.

It is another object of the invention to provide a process for the preparation of diesters of poly (oxyalkylene glycols) and amino acids that allows easy esterification.

SUMMARY OF THE INVENTION

Accordingly the present invention relates to a process for the preparation of diesters of poly (ethylene glycol) of formula I below

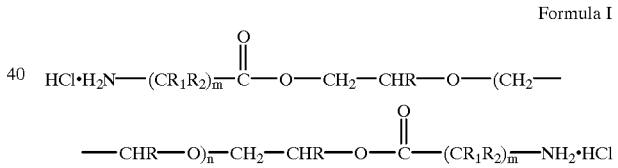

Formula I wherein $R_1$ and $R_2$ are H, m is an integer from 0 to 12, or
when $R_1$ is H, $R_2$ is —$CH_2$—Ph—OH or —$CH_2$—SH or —$CH_3$—(CH)—$CH_2$—$CH_3$ and mn is an integer equal to 1, R is hydrogen or methyl or a mixture of hydrogen and methyl on the individual molecule, and n is an integer of from 0 to 100, said process comprising reacting poly (oxyalkylene glycol) and amino acid hydrochloride in the presence of a condensing agent in a suitable solvent at a temperature in the range of 0° C. to room temperature for a period ranging between 1 hour to 24 hours, filtering the reaction mixture, pouring the filtrate into another solvent, which is a nonsolvent for the products and isolating the precipitated products.

In one embodiment of the invention, poly(oxyalkylene glycol) may be selected from compounds of the formula $HOCH_2$—CHR—($CH_2$—CHR—O—$)_n$—$CH_2$—CHR—OH wherein R is hydrogen, methyl or a mixture of hydrogen and methyl on the individual molecule, n is an interger which represents the average number of oxyalklene groups, and is preferably from 0 to 100.

In yet another embodiment of the invention, the amino acid may be selected from trifunctional and difunctional amino acids and their respective hydrochlorides.

In a further embodiment of the invention, the trifunctional amino acids are selected from tyrosine and cysteine.

In a further embodiment of the invention, the difunctional amino acids are selected from glycine, isoleucine, 6 amino caproic acid, 11 amino caproic acid.

In yet another embodiment of the invention, the condensing agent may be selected from carbodiimides such as dicyclohexyl carbodiimide, diisopropyl carbodiimide or the like.

In another embodiment of the invention, the suitable solvent may be selected from acetonitrile, tetrahydrofuran, dioxane, dimethyl formamide and the like.

DETAILED DESCRIPTION OF THE INVENTION

The process is typically carried out under mild conditions. Stoichiometric amounts of poly (oxyalkylene glycol) and amino acid hydrochloride are dissolved in a suitable solvent and the stoichiometric amount of a carbodiimide is added and the reaction mixture is stirred at room temperature for 12 hours. After this, the reaction mixture is filtered to remove the urea salts formed due to the condensation reaction. The clear solution containing the diester of poly (oxyalkylene glycol) and amino acid hydrochloride is then poured into another solvent which is a non solvent for the diester. Precipitated diester is then isolated.

The ranges and limitations provided in the present specification, examples and claims are those believed to particularly point out and distinctly cover the present invention. However, other ranges and limitations which perform substantially the same function in the same or substantially the same manner to obtain the same or substantially the same results are intended to be within the scope of the instant invention. The process of the present invention will be further described by the following examples which are provided for illustration and are not to be construed as limiting the invention.

EXAMPLE 1

Preparation of bis (tyrosyl hydrochloride) poly (ethylene glycol) 6000 diester (Bis tyr.HCl–PEG 6000)

In a 100 ml capacity conical flask, 6 g PEG 6000 (0.001 M), 0.435 g (0.002 M) tyr.HCl, and 10 ml DMF were taken. The contents of the flask were gently heated to dissolve the solids and obtain a clear solution. To this solution, 0.412 g DCC (0.002 M) dissolved in 5 ml DMF was added in a single portion. The reaction mixture was stirred at room temperature (25° C.) for 24 hours. It was then filtered to separate out dicyclohexyl urea (DCU) formed and the clear solution was poured into a 200 ml diethyl ether to precipitate out white powdery product. The product was isolated and purified by reprecipitation from methanol into diethyl ether.

Yield (78%)

EXAMPLE 2

Preparation of bis (cistyl hydrochloride) poly (ethylene glycol) 6000 diester (Bis cyst.HCl–PEG 6000)

In a 100 ml capacity conical flask, 6 g PEG 6000 (0.001 M), 0.3 15 g (0.002M) cyst.HCl, and 10 ml DMF were taken. The contents of the flask were gently heated to dissolve the solids and obtain a clear solution. To this solution, 0.412 g DCC (0.002 M) dissolved in 5 ml DMF was added in a single portion. The reaction mixture was stirred at room temperature (25° C.) for 24 hours. It was then filtered to separate out dicyclohexyl urea (DCU) formed and the clear solution was poured into a 200 ml diethyl ether to precipitate out white powdery product. The product was isolated and purified by reprecipitation from methanol into diethyl ether.

Yield (70%)

EXAMPLE 3

Preparation of bis (isaoleucyl hydrochloride) poly (ethylene glycol) 6000 diester (Bis isoleu.HCl–PEG 6000)

In a 100 ml capacity conical flask, 6 g PEG 6000 (0.001 M), 0.335 g (0.002 M) isoleu.HCl, and 10 ml DMF were taken. The contents of the flask were gently heated to dissolve the solids and obtain a clear solution. To this solution, 0.412 g DCC (0.002 M) dissolved in 5 ml DMF was added in a single portion. The reaction mixture was stirred at room temperature (25° C.) for 24 hours. It was then filtered to separate out dicyclohexyl urea (DCU) formed and the clear solution was poured into a 200 ml diethyl ether to precipitate out white powdery product. The product was isolated and purified by reprecipitation from methanol into diethyl ether.

Yield (68%)

EXAMPLE 4

Preparation of bis (6 amino caproyl hydrochloride) poly (ethylene glycol) 6000 diester (Bis 6ACA.HCl–PEG 6000)

In a 100 ml capacity conical flask, 6 g PEG 6000 (0.001 M), 0.335 g (0.002 M) 6ACA.HCl, and 10 ml DMF were taken. The contents of the flask were gently heated to dissolve the solids and obtain a clear solution. To this solution, 0.412 g DCC (0.002 M) dissolved in 5 ml DMF was added in a single portion. The reaction mixture was stirred at room temperature (25° C.) for 24 hours. It was then filtered to separate out dicyclohexyl urea (DCU) formed and the clear solution was poured into a 200 ml diethyl ether to precipitate out white powdery product. The product was isolated and purified by reprecipitation from methanol into diethyl ether.

Yield (80%)

EXAMPLE 5

Preparation of bis (glycyl hydrochloride) poly (ethylene glycol) 6000 diester (Bis gly.HCl–PEG 6000)

In a 100 ml capacity conical flask, 6 g PEG 6000 (0.001 M), 0.223 g (0.002 M) gly.HCl, and 10 ml DMF were taken. The contents of the flask were gently heated to dissolve the solids and obtain a clear solution. To this solution, 0.412 g DCC (0.002 M) dissolved in 5 ml DMFf was added in a single portion. The reaction mixture was stirred at room temperature (25° C.) for 24 hours. It was then filtered to separate out dicyclohexyl urea (DCU) formed and the clear solution was poured into a 200 ml diethyl ether to precipitate out white powdery product. The product was isolated and purified by reprecipitation from methanol into diethyl ether.

Yield (82%)

EXAMPLE 6

Preparation of bis (11 amino undecanoyl hydrochloride) poly (ethylene glycol) 6000 diester (Bis 11AU.HCl–PEG 6000)

In a 100 ml capacity conical flask, 6 g PEG 6000 (0.001 M), 0.475 g (0.002 M) 11AU.HCl, and 10 ml DMF were taken. The contents of the flask were gently heated to dissolve the solids and obtain a clear solution. To this solution, 0.412 g DCC (0.002 M) dissolved in 5 ml DMF was added in a single portion. The reaction mixture was stirred at room temperature 25° C.) for 24 hours. It was then filtered to separate out dicyclohexyl urea (DCU) formed and the clear solution was poured into a 200 ml diethyl ether to precipitate out white powdery product. The product was isolated and purified by reprecipitation from methanol into diethyl ether.

Yield (80%)

Quantification of hydrochloride salt present in the diesters was done by determining their acid values. Data for acid values of all compounds are listed in Table 1 show that theoretical and found acid values are in close agreement, taking into consideration the polydispersity in commercial PEG samples used.

| No. | Diester | Acid values milimoles HCl/g (calculated)* | Acid values milimoles HCl/g (found) |
|---|---|---|---|
| 1 | Bis tyr.HCl - PEG6000 | 0.2 to 0.3 | 0.224 |
| 2 | Bis cyst.HCl - PEG 6000 | 0.2 to 0.3 | 0.29 |
| 3 | Bis isoleu.HCl - PEG6000 | 0.2 to 0.3 | 0.213 |
| 4 | Bis 6ACA.HCl - PEG6000 | 0.2 to 0.3 | 0.224 |
| 5 | Bis gly.HCl - PEG6000 | 0.2 to 0.3 | 0.254 |
| 6 | Bis 11AU.HCl - PEG6000 | 0.2 to 0.3 | 0.26 |

*Acid values calculated for PEG 6000 with molecular weight range 6000 to 7500

Advantages of the Invention

1. The process is carried out under mild conditions and is generally applicabble to various amino acids.
2. Fatty alcohols that are otherwise difficult to esterify by conventional methods, can be easily esterified using the process of the present invention.
3. The use of the hydrochloride salt as —NH$_2$ protecting group can be extended in various other carbodiimide mediated condensation reactions using amino acids.

We claim:

1. A process for the preparation of diesters of poly (ethylene glycol) of formula I below

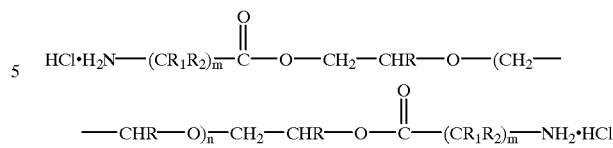

wherein $R_1$ and $R_2$ are H, m is an integer from 0 to 12, or
when $R_1$ is H, $R_2$ is —CH$_2$—Ph—OH or —CH$_2$—SH or —CH$_3$—(CH)—CH$_2$—CH$_3$ and m is an integer equal to 1, R is hydrogen or methyl or a mixture of hydrogen and methyl on the individual molecule, and n is an integer of from 0 to 100, said process comprising reacting poly (oxyalkylene glycol) and amino acid hydrochloride in the presence of a condensing agent in a suitable solvent at a temperature in the range of 0° C. to room temperature for a period ranging between 1 hour to 24 hours, filtering the reaction mixture, pouring the filtrate into another solvent, which is a nonsolvent for the products and isolating the precipitated products.

2. A process as claimed in claim 1 wherein the poly (oxyalkylene glycol) is selected from compounds of the formula HOCH$_2$—CHR—(CH$_2$—CHR—O—)$_n$—CH$_2$—CHR—OH wherein R is hydrogen, methyl or a mixture of hydrogen and methyl on the individual molecule, and n is an integer which represents the average number of oxyalkylene groups.

3. A process as claimed in claim 1 wherein the amino acid is selected from trifunctional and difunctional amino acids and their respective hydrochlorides.

4. A process as claimed in claim 3 wherein the trifunctional amino acids are selected from tyrosine and cysteine.

5. A process as claimed in claim 3 wherein the difunctional amino acids are selected from glycine, isoleucine, 6-amino caproic acid, and 11-amino undecanoic acid.

6. A process as claimed in claim 1 wherein the condensing agent is a carbodiimide.

7. A process as claimed in claim 1 wherein the suitable solvent is selected from acetonitrile, tetrahydrofuran, dioxane, dimethyl formamide.

8. A process as claimed in claim 2 wherein n is an integer from 0 to 100.

9. A process as claimed in claim 6 wherein the carbodiimide is dicyclohexyl carbodiimide or diisopropyl carbodiimide.

* * * * *